(12) United States Patent
Hu et al.

(10) Patent No.: US 7,087,683 B2
(45) Date of Patent: *Aug. 8, 2006

(54) SULFONAMIDE MODIFIED AMINOPLAST CROSSLINKERS AND POWDER COATING COMPOSITIONS CONTAINING SUCH CROSSLINKERS

(75) Inventors: Shengkui Hu, Baden, PA (US); Anthony M. Chasser, Allison Park, PA (US); William H. Retsch, Castle Shannon, PA (US); Ronald R. Ambrose, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 238 days.

This patent is subject to a terminal disclaimer.

(21) Appl. No.: 10/310,479

(22) Filed: Dec. 5, 2002

(65) Prior Publication Data

US 2003/0100686 A1     May 29, 2003

Related U.S. Application Data

(63) Continuation-in-part of application No. 09/918,788, filed on Jul. 31, 2001, now Pat. No. 6,635,724.

(51) Int. Cl.
*C08L 61/32* (2006.01)
*C08L 61/00* (2006.01)
*C08G 12/30* (2006.01)

(52) U.S. Cl. .............. 525/509; 525/159; 525/162; 525/406; 525/443; 525/456; 525/510; 528/249; 528/254; 528/258; 528/261; 528/265

(58) Field of Classification Search ........... 525/159, 525/162, 406, 443, 456, 509, 510; 528/249, 528/254, 258, 261, 265

See application file for complete search history.

(56) References Cited

U.S. PATENT DOCUMENTS

| | | | | | |
|---|---|---|---|---|---|
| 2,361,322 | A | * | 10/1944 | Schroy | 523/436 |
| 3,082,180 | A | * | 3/1963 | Leslie et al. | 524/27 |
| 3,759,854 | A | | 9/1973 | Chang et al. | 260/21 |
| 3,922,447 | A | | 11/1975 | Isaksen et al. | 428/474 |
| 3,980,732 | A | | 9/1976 | Isaksen et al. | 260/850 |
| 3,980,733 | A | | 9/1976 | Isaksen et al. | 260/850 |
| 4,102,943 | A | | 7/1978 | Isaksen et al. | 260/850 |
| 4,133,843 | A | | 1/1979 | Isaksen et al. | 260/850 |
| 4,151,220 | A | | 4/1979 | Watanabe et al. | 260/850 |
| 4,190,714 | A | | 2/1980 | Isaksen et al. | 525/163 |
| 4,190,715 | A | | 2/1980 | Isaksen et al. | 525/163 |
| 4,230,829 | A | | 10/1980 | Yoshihara et al. | 525/162 |
| 5,302,462 | A | | 4/1994 | Shah et al. | 428/482 |
| 6,812,297 | B1 | * | 11/2004 | Ramesh et al. | 525/474 |
| 6,878,791 | B1 | * | 4/2005 | Martz et al. | 527/600 |

FOREIGN PATENT DOCUMENTS

EP   0509138   10/1992

* cited by examiner

Primary Examiner—Jeffrey B. Robertson
(74) Attorney, Agent, or Firm—Diane R. Meyers

(57) ABSTRACT

A crosslinking agent that is an ungelled reaction product of (a) an aminoplast resin and (b) a compound having active hydrogen groups reactive with the aminoplast resin such that the crosslinking agent is essentially free of functional groups reactive with an aminoplast resin and has a glass transition temperature of at least 10° C. is disclosed. Compound (b) is, more specifically, a monofunctional sulfonamide having only one active hydrogen. Methods for preparing crosslinking agents are also disclosed. Further provided is a curable powder coating composition including a polymer having a glass transition temperature of at least 30° C. containing reactive functional groups and the present crosslinking agent; a multilayer composite coating compositions and substrates coated therewith are also disclosed. Methods for modifying aminoplasts are also disclosed.

15 Claims, No Drawings

SULFONAMIDE MODIFIED AMINOPLAST CROSSLINKERS AND POWDER COATING COMPOSITIONS CONTAINING SUCH CROSSLINKERS

CROSS-REFERENCE TO RELATED APPLICATIONS

This is a continuation-in-part of U.S. patent application Ser. No. 09/918,788, filed Jul. 31, 2001, now U.S. Pat. No. 6,635,724 the contents of which are hereby incorporated by reference.

FIELD OF THE INVENTION

The present invention relates to crosslinking agents based on modified aminoplast resins and to powder coating compositions containing these crosslinking agents.

BACKGROUND OF THE INVENTION

In recent years, powder coatings have become increasingly popular because these coatings are inherently low in volatile organic content ("VOC"). The low VOC significantly reduces air emissions into the atmosphere during application and curing as compared to liquid coatings.

Hydroxyl, carboxyl, carbamate, and/or epoxy functional resins, such as acrylic and polyester resins having relatively high glass transition temperatures ("Tg"), are commonly used as the main film-forming polymers for powder coatings. The relatively high Tg of such polymers provides powder coatings having good storage stability. When exposed to the extreme temperatures both during shipping and/or storage, however, even better powder coating stability is desired By "stability" or "storage stability" is meant the ability of the individual powder particles that comprise the powder coating to resist the tendency to adhere to one another, which causes "clumping" or "fusing" of the powder coating composition. Powder coating compositions having very poor storage stability can be difficult, if not impossible, to apply.

Aminoplast resins are well known in the art as low cost crosslinking agents for hydroxyl, carboxyl, and/or carbamate functional polymers in conventional liquid coating compositions. Aminoplast resins can impart enhanced properties to the coatings, such as exterior durability, chemical resistance, and mar resistance. Attempts to produce powder coating compositions based on conventional aminoplast resins that provide these desirable properties often give unsatisfactory results because these materials are typically in liquid form. In addition to problems with incorporating the liquid aminoplast into the powder coating, their incorporation, when successful, can result in a coating having poor powder stability.

Methoxylated aldehyde condensates of glycoluril, which are solid aminoplast resins, are employed as crosslinking agents in powder coating compositions. Although solid in form, these materials can still depress the Tg of the powder coating composition significantly, even when combined with high Tg film-forming polymers such as the acrylic polymers discussed above. A depression in Tg can also result in poor powder stability.

Moreover, the use of conventional aminoplast resins in powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating; as the viscosity of the coating increases during the curing process, "pinholes" or "craters" are formed as the gas escapes through the coating surface.

Thus, there is a need in the art for improved aminoplast crosslinkers that can be used with powder coatings.

SUMMARY OF THE INVENTION

The present invention is directed to a crosslinking agent comprising the ungelled reaction product of (a) at least one aminoplast resin; and (b) at least one compound having active hydrogen groups reactive with the aminoplast resin (a). An active hydrogen group refers generally to a group that has one or more active hydrogens, such as those provided by hydroxyl, amide, amine, carboxylic acid, carbamate, urea and thiol groups. A method for preparing such a crosslinking agent is also disclosed.

As discussed above, the incorporation of aminoplast resins into powder coatings has been difficult to achieve. The present invention overcomes these difficulties by providing modified aminoplasts that are in solid, ungelled form. An "ungelled" product is one that has a measurable intrinsic viscosity when dissolved in a suitable solvent; a gelled product, in contrast, is one whose intrinsic viscosity when dissolved in a solvent is too high to measure. In addition, an ungelled product can be melted, solidified, and remelted. The ungelled products of the present invention can therefore be incorporated into powder coatings and processed according to methods standard in the art. Significantly, powder coatings containing the present modified aminoplasts give good performance, have good stability and are easy to use.

DETAILED DESCRIPTION OF THE INVENTION

The present invention is directed a crosslinking agent comprising an ungelled reaction product of (a) an aminoplast resin and (b) a compound having active hydrogen groups reactive with aminoplast resin (a). Compound (b) is selected from at least one of: (i) compounds having the following structure (I):

wherein X is aromatic or cycloaliphatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group that is reactive with the aminoplast resin (a); (ii) compounds having the following structure (II or III):

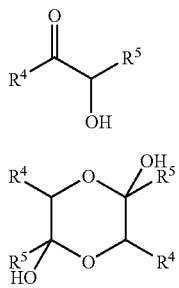

(II)

(III)

where $R^4$ and $R^5$ are the same or different and each independently represents an aromatic group having 4 to 20 carbons or an alkyl group having 1 to 12 carbon atoms; and (iii) compounds different from both (i) and (ii) and having a melting point of at least 60° C. Mixtures of compounds (i), (ii) and/or (iii) can also be used. "(Cyclo)alkyl" refers to both cycloalkyl and alkyl. The crosslinking agent is essentially free of functional groups that are reactive with an aminoplast resin, and has a Tg of at least 10° C.

Aminoplast resins are based on the condensation product of an aldehyde with an amino- or amido-group containing compound. While the aldehyde employed is most often formaldehyde, other aldehydes such as acetaldehyde, crotonaldehyde, acrolein, benzaldehyde, furfural, and glyoxal can also be used. Amine/amide containing compounds include those derived from at least one of glycoluril, aminotriazine, or benzoguanamine. Such compounds include, for example, alkoxyalkyl derivatives of melamine, glycoluril, benzoguanamine, acetoguanamine, formaguanamine, spiroguanamine, and the like. Condensation products obtained from the reaction of alcohols and formaldehyde with melamine, urea or benzoguanamine are most common and most suitable for use in the present invention. Condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, and 3,4,6-tris(ethylamino)-1,3,5 triazine.

Aminoplast resins typically contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol, and others, as well as benzyl alcohol, and other aromatic alcohols, cyclic alcohols such as cyclohexanol, monoethers of glycols, and halogen-substituted or other substituted alcohols, such as 3-chloropropanol and butoxyethanol. Aminoplast resins that are substantially alkylated with methanol or butanol are particularly suitable for use herein.

Nonlimiting examples of suitable aminotriazine compounds suitable for use in the present invention include alkoxyalkyl aminotriazines, such as (methoxymethyl) melamine-formaldehyde resin, for example CYMEL 300, CYMEL 303, RESIMENE 745, and RESIMENE 757; ethylated-methylated benzoguanamine-formaldehyde resin, for example CYMEL 1123; and methylated-butylated melamine-formaldehyde resin, for example CYMEL 1135, CYMEL 1133 and CYMEL 1168. These products are commercially available from either Cytec Industries, Inc. or Solutia, Inc.

In one embodiment of the present invention, the aminoplast resins comprise highly alkylated, low imino aminoplast resins that have a degree of polymerization ("DP") of less than 2.0, often less than 1.8, and typically less than 1.5. Generally, the number average degree of polymerization is defined as the average number of structural units per polymer chain. For purposes of the present invention, a DP of 1.0 would indicate a completely monomeric triazine structure, while a DP of 2.0 indicates two triazine rings joined by a methylene or methylene-oxy bridge. It should be understood that the DP values reported herein represent average DP values as determined by gel permeation chromatography data.

In another embodiment of the present invention, the aminoplast resin (a) comprises a compound derived from glycoluril, such as alkoxylated aldehyde condensates of glycoluril. The alkoxylated aldehyde condensates of glycoluril suitable for use as the aminoplast resin (a) can be prepared by reacting glycoluril, or acetylene diurea, with an aldehyde, typically formaldehyde, to form tetra-alkylol glycoluril. In this embodiment, the alkylol groups are usually etherified with a mono-alcohol, such as a $C_1$ to $C_6$ monoalcohol, to form tetra-alkoxy alkyl glycoluril. An example of such a tetra-alkoxyalkyl glycoluril is tetra-methoxy methyl glycoluril, which is. commercially available as POWDERLINK 1174 from Cytec Industries, Inc.

In addition to the aminoplast resin (a), the reactants used to form the crosslinking agent of the present invention further comprise (b) at least one compound having active hydrogen groups reactive with aminoplast resin (a). In one embodiment of the present invention, compound (b) comprises at least one of compound (i) having structure (I). As noted above, "X" represents a cycloaliphatic group, for example cyclohexyl, or an aromatic moiety, for example phenyl, and substituted phenyl groups. These groups can be any fused or bridged ring structures such as naphthyl, anthracyl, and benzofuranyl. Also, the aromatic groups can be unsubstituted or substituted with heteroatoms, for example O, N, and S. Nonlimiting examples of aromatic groups suitable as the X moiety include phenyl, naphthyl, anthracyl, pyrene, benzofuranyl, and the like.

At least one of $R^1$, $R^2$, and $R^3$ in structure (I) represents a group comprising an active hydrogen-containing group reactive with the aminoplast resin (a) such as a group selected from hydroxyl, amide, amine, carboxylic acid, carbamate, urea, thiol, and combinations thereof. In a specific embodiment, at least one of $R^1$, $R^2$, and $R^3$ represents a group comprising at least one hydroxyl group. Nonlimiting examples of active hydrogen-containing compounds suitable for use as the reactant (b)(i) include benzyl alcohol and substituted benzyl alcohols such as 3-phenoxybenzyl alcohol and 4-methoxybenzyl alcohol, phenethyl alcohol, benzopinacol, N-benzylformamide, benzyl lactate, benzyl mandelate, benzyl mercaptan, N-benzylmethamine, 3-furanmethanol, furfuryl alcohol, pyridylcarbinols, for example, 2-pyridylcarbinol, and 3-pyridylcarbinol, 1-pyrenemethanol, 9-anthrancenemethanol, 9-fluorenemethanol, 9-hydroxyfluorene, 9-hydroxyxanthene, 9-phenylxanthen-9-ol, 4-stilbenemethanol and triphenylmethanol. In a specific embodiment, the compound is benzyl alcohol and the ratio of aminoplast to benzyl alcohol is 1 to greater than 1.5, such as 1 to from 3 to 33.

In another embodiment, the active hydrogen-containing compound (b) comprises at least one of compound (ii) having the following structure (II):

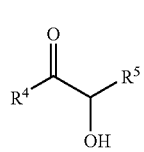

(II)

or dimer derivatives thereof as discussed below, where $R^4$ and $R^5$ are the same or different and each independently represents an aromatic group having 4 to 20 carbon atoms or an alkyl group having 1 to 12 carbon atoms. In a specific embodiment of the present invention, one or both of the substituent groups $R^4$ and $R^5$ are aromatic groups, for example phenyl, naphthyl, methoxy phenyl, or dimethylaminophenyl groups. Suitable aromatic groups can also contain one or more heteroatoms, such as O, N, and S, either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent group(s) may be attached to the aromatic ring in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring may be present in any position or combination of positions. For example, such heteroaromatic groups can include but are not limited to furans, pyridines, thiophenes, triazines, imidazoles, oxazoles, thiazoles, pyrazoles and triazoles. Nonlimiting examples of such compounds include anisoin, pyridoin, furoin, bufyroin.

In one particular embodiment, the active hydrogen-containing compound (b)(ii) comprises an active hydrogen-containing compound selected from benzoin, hydroxycyclohexyl phenylketone, and mixtures thereof.

Compounds having the general structure (II) above are known to form dimeric derivatives, particularly when $R^4$ and $R^5$ are alkyl:

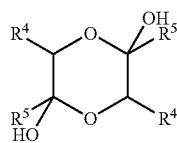

(III)

Such dimer derivatives can have structure (III) above where $R^4$ and $R^5$ are as described above for structure (II).

In yet another embodiment of the present invention, the active hydrogen-containing compound (b) comprises at least one of compound (iii), which is a compound different from both (i) and (ii) and has a melting point of at least 60° C. The melting point of a compound can be determined by using a standard capillary melting point apparatus or by thermal analysis (ASTM E974-95).

Generally, the melting point of the active hydrogen-containing compound (b)(iii) is less than 250° C., usually less than 220° C., and typically less than 200° C. Also, the melting point of the active hydrogen-containing compound (b)(iii) generally is at least 60° C., usually at least 80° C., and typically at least 90° C. or 100° C. The melting point of the active hydrogen-containing compound (b)(iii) can range between any combination of these values inclusive of the recited values. Nonlimiting examples of compounds suitable for use as reactant (b)(iii) include mono-alcohols such as borneol, norborneol, isoborneol, 1-adamantanemethanol, 1-adamantanol, 2-methyl-2-adamantanol and 5-norbornen-2-ol; secondary amides, such as aliphatic cyclic amides such as 1-methylhydantoin, 2,4-thiazolidinedione, 2-azacyclotridecanone, 3,4,5,6,7,8-hexahydro-2(1H)-quinoline, 4-azatricyclo(4.3.1.1(3,8))undecan-5-one and 4-methoxy-3-pyrrolin-2-one; aliphatic open chain amides, such as N-(1-adamantyl)acetamide) and N-tert-butylacrylamide; aromatic (poly)cyclic amides, including lactams, such as 1-acetamidopyrene, 2-acetamide-3-nitro-9-fluorenone, 2-acetoamide-7-fluorfluorene, 2-acetamidofluorene, 4-acetamido-9-fluorenone, naphthol AS acetate, 1-phenyl-3-pyrazolidinone, 2,3-dimethyl-1-(4-methylphenyl)-3-pyrazolin-5-one, 3,4-dimethyl-1-phenyl-3-pyrazolin-5-one, 3-(4-ethoxyphenyl)-1-(2-nitrophenyl)-hydantoin, 4-acetamidoantipyrine, and 4-acetamidobenzaldehyde; aromatic open chain amides, such as 3-acetamidocoumarin and p-acetophenetidide; and mono-urethanes such as those obtained by reacting high melting point mono-alcohols (such as those described immediately above) with suitable mono-isocyanates.

In a specific embodiment, compound (b)(iii) is a monofunctional sulfonamide with only one active hydrogen. It will be appreciated that such sulfonamides generally have the structure (IV):

$$R^6SO_2NHR^7 \qquad (IV)$$

wherein $R^6$ can be virtually any unreactive organic moiety. Examples include, H, (cyclo)alkyl having from 1 to 12 carbon atoms, aryl, alkaryl, aralkyl, alkoxy, or aryloxy, all of which can be substituted or unsubstituted. $R^7$ is a (cyclo)alkyl group having from 1 to 12 carbon atoms, aryl, alkaryl, aralkyl, alkoxycarbonyl, alkylcarbonyl, or an arylcarbonyl. Substituents $R^6$ and $R^7$ can also be intramolecularly connected. Specific examples of compounds within structure (IV) include N-alkyl-p-toluene sulfonamide and saccharin.

It will be appreciated that a monofunctional sulfonamide with only one active hydrogen will yield a different reaction product with aminoplast resins than will a monofunctional sulfonamide with a single functional group having two active hydrogens or a polyfunctional sulfonamide with more than one functional group and more than one active hydrogen. An example of a monofunctional sulfonamide with two active hydrogens is p-toluenesulfonamide. N-ethyl-p-toluenesulfonamide, however, is an example of a monofunctional sulfonamide with only one active hydrogen.

More specifically, monofunctional sulfonamides with a single active hydrogen, when reacted with aminoplasts, can give materials capable of forming solids at room temperature and without chain extension of the aminoplast; the solid or ungelled reaction products are storage stable. As a result, the molecular weight of the reaction product is typically less than about 5000, such as less than about 3000, as determined by gel permeation chromatography using polystyrene as a standard. Molecular weight, as used herein, refers to weight average molecular weight ("Mw") unless indicated otherwise. This relatively low molecular weight product allows the resins to maintain lower viscosity and better flow when molten during processing and when applied and melted in the coating composition. In contrast, monofunctional and polyfunctional sulfonamides with two or more active hydrogens, upon reaction with an aminoplast resin, chain extend the aminoplast because of their two or more reactive sites. The result is a high molecular weight product (i.e. greater than 5.000) that has a higher melt viscosity resulting in poor flow characteristics. Such a product would not be as easy to process into a powder coating as would the reaction product made from a monofunctional sulfonamide with a single active hydrogen.

The active hydrogen-containing compound (b) can comprise one or more of compounds (b)(i), (b)(ii), and (b)(iii). Inclusion of the active hydrogen-containing compound (b) as a reactant in the preparation of the crosslinking agent of the present invention can provide several advantages. First, reaction of the active hydrogen-containing compound (b) with the aminoplast resin (a) can generally increase the Tg of the resultant crosslinker as compared to an analogous crosslinking agent having no such modification. Also, many of the compounds (b)(i), (b)(ii) and (b)(iii) as described above can allow for the displacement reaction of more alkoxy groups of the aminoplast resin without resulting in a gelled reaction product. Such a crosslinking agent, when incorporated into curable powder coating compositions, can effect less gassing upon curing. Furthermore, when crosslinking agents of the present invention are used in curable powder coating compositions, the degassing agent may be released in situ. This can reduce adverse effects, for example, yellowing of the film, which can be caused by the presence of separately added degassing agents during curing processes.

As noted above, compound (b) can comprise one or more compounds within (i), (ii), and/or (iii). In addition, the present crosslinkers can be prepared by further reaction with compound (c), a mono-hydroxy aromatic compound having structure (V):

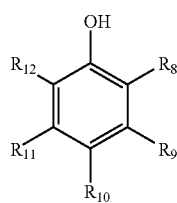
(V)

wherein each of $R_8$ through $R_{12}$ are the same or different and are selected from H, a monovalent hydrocarbon group, $COOR_{13}$ where $R_{13}$ is H or a monovalent hydrocarbon group, $NO_2$, halogen or $X_1R_{14}$, where $X_1$ is oxygen or sulfur and $R_{14}$ is a monovalent hydrocarbon group having 1 to 8 carbon atoms. A monovalent hydrocarbon group is an organic group-containing carbon and hydrogen. The hydrocarbon groups may be aliphatic or aromatic, and may contain from 1 to 24 (in the case of aromatic from 3 to 24) carbon atoms. A "monovalent hydrocarbon group" can also be a heteroatomic hydrocarbon group; that is, one or more of the carbon molecules in the group can be substituted with heteroatoms, typically oxygen or nitrogen. Nonlimiting examples of such monovalent hydrogen groups include alkyl, alkoxy, aryl, alkylaryl and alkoxyaryl groups. Particularly suitable compounds within structure V include phenol and t-butyl phenol.

Particularly suitable combinations of compound (b)(iii) and compound (c) are n-alkyl-p-toluene sulfonamide or saccharin with t-butyl phenol.

The aminoplast resin (a) generally constitutes 90 weight percent or less, often 85 weight percent or less, and typically 80 weight percent or less of the reaction mixture, based on the total combined weight of reactants (a) and (b). Also, the aminoplast resin (a) generally constitutes at least 55 weight percent, often at least 60 weight percent, and typically at least 65 weight percent of the reaction mixture, based on the total combined weight of reactants (a) and (b). The percent by weight of the aminoplast resin (a) present in the reaction mixture can range between any combination of these values inclusive of the recited values.

The active hydrogen-containing compound (b) generally constitutes 45 weight percent or less, often 40 weight percent or less, and typically 35 weight percent or less of the reaction mixture, based on the total combined weight of reactants (a) and (b). Also, the active hydrogen group-containing compound (b) generally constitutes at least 10 weight percent, often at least 15 weight percent, and typically at least 20 weight percent of the reaction mixture, based on the total combined weight of reactants (a) and (b). The percent by weight of the active hydrogen-containing compound (b) present in the reaction mixture can range between any combination of these values inclusive of the recited values.

If compound (c) is used, it generally constitutes 15 weight percent or less, often 10 weight percent or less, and typically 5 weight percent or less of the reaction mixture, based on the total combined weight of reactants (a), (b) and (c). Also, compound (c) generally constitutes at least 1 weight percent, often at least 2 weight percent, and typically at least 3 weight percent of the reaction mixture, based on the total combined weight of reactants (a) and (b). The percent by weight of compound (c) present in the reaction mixture can range between any combination of these values inclusive of the recited values.

The crosslinking agent of the present invention generally has a Tg of at least 10° C., often at least 15° C., usually at least 20° C., and typically at least 25° C. Also, the crosslinking agent generally has a Tg of less than 85° C., often less than 80° C., usually less than 75° C., and typically less than 70° C. The Tg of the crosslinking agent can range between any combination of these values, inclusive of the recited values.

The Tg can be calculated or measured experimentally using differential scanning calorimetry (rate of heating 10° C. per minute, Tg taken at the first inflection point). Unless otherwise indicated, the stated Tg as used herein refers to the measured Tg.

In its broadest sense, the present invention is directed to a method for modifying an aminoplast so as to make it suitable for use in powder coatings. If the starting aminoplast is liquid, "suitable" refers to making it an ungelled, solid product. If the aminoplast is already ungelled, "suitable" means that the aminoplast is modified so as not to lower the Tg of the powder coating to which it is added or is modified to lower the amount of gassing that its seen during cure as compared to the unmodified starting aminoplast. The method generally involves mixing together an aminoplast resin and a modifying compound in an appropriate ratio; heating the mixture to a temperature of 90° C. to 160° C., such as 100° C. to 140° C.; and maintaining this temperature for a time sufficient to obtain an ungelled reaction product that has a Tg of at least 10° C. and that is essentially free of active hydrogen-containing groups as determined by appropriate analytical techniques, such as infrared spectroscopy.

More specifically, the aminoplast resin (a) and a modifying compound (b) are combined in a suitably equipped reaction vessel, typically with an appropriate strong acid as catalyst, and optionally a suitable solvent. Any suitable solvent can be used, with aromatic solvents being most often employed. Examples of suitable aromatic solvents include xylene, toluene, and mixtures of these solvents. Examples of strong acids suitable for use as a catalyst include, but are not limited to, para-toluene sulfonic acid, dodecyl benzene sulfonic acid, and dodecyl benzene disulfonic acid. Normal condensation techniques well known in the art can be used. The reaction admixture is heated to a temperature ranging from 90° C. to 160° C., usually from 100° C. to 140° C., and held at that temperature for a period sufficient to obtain an ungelled product having a Tg of at least 10° C. The reaction is terminated when the reaction end point (e.g., the disappearance of active hydrogen-containing groups) is detected by infrared spectroscopy, acid number, or other appropriate analytical methods. The term "analytical methods" refers to any suitable method for monitoring disappearance of the active hydrogen-containing group.

"Modifying compound" refers to any compound that will react with an aminoplast and that, upon reaction, renders the aminoplast suitable for use in a powder coating. Generally, the modifying compound is one that contains at least one active hydrogen group. Whether the modified aminoplast has such suitability can be determined by performing the reaction described above. A modified liquid aminoplast will be suitable if it is ungelled; a modified solid aminoplast will be suitable if, when mixed with a powder coating, it does not raise the Tg of the coating or it does decrease the gassing in the coating during cure as compared to when the unmodified aminoplast is used. Examples of suitable modifying compounds include phenols, polyhydric compounds, polyester polyols, urethanes, the active hydrogen-containing compounds described herein, monofunctional carboxylic acids having a pKa of greater than 3 and mixtures thereof. When the modifying compound is a polyester polyol comprising the reaction product of a cycloaliphatic polyol and a cyclic polycarboxylic acid or anhydride, and the aminoplast is an aminotriazine compound having one or less non-alkylated NH bond per triazine ring, the aminotriazine is present in a weight ratio excess as compared to the polyol. When the modifying compound is a monohydroxy single ring aromatic compound having the formula:

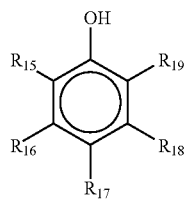

wherein $R_{15-19}$ are the same or different and are selected from H, $C_{1-4}$ alkyls, $C_{1-4}$ alkoxys and $NO_2$, and at least one of $R_{15-19}$ is H, and the aminoplast is an aminotriazine compound having one or less non-alkylated NH bond per triazine ring, the ratio of aromatic compound to aminotriazine is from 1.0 to less than 1.8:1 to greater than 2.2 to 3:1. When the modifying compound is a reactive polyhydric compound, the aminoplast is not an alkoxylated aldehyde condensate of glycoluril. Details on specific modifying compounds are provided in U.S. application Ser. Nos. 09/666,175; 09/666,253 (now U.S. Pat. No. 6,316,109); Ser. No. 09/666,265 (now U.S. Pat. No. 6,441,103); Ser. No. 09/666,575 (now U.S. Pat. No. 6.451,928); and Ser. No. 09/667,756, all filed Sep. 21, 2000; Ser. Nos. 09/918,788; 09/918,848; 09/919,092; 09/919,094; 09/919,299; and 09/918,983, all filed Jul. 31, 2001, the contents of which are all hereby incorporated by reference. The invention is not limited to these specific modifying compounds, however, and the determination as to whether a compound is a modifying compound within the present invention can be made by one skilled in the art without undue experimentation.

In a specific embodiment, the method is directed to conversion of a liquid aminoplast into a solid, ungelled crosslinker by reacting an aminoplast with a modifying compound that, in this case, would be a powder forming compound. A "powder forming compound", as used herein, refers to a modifying compound that, when reacted with a liquid aminoplast resin in the manner and under the conditions described above, will result in an ungelled reaction product based on the aminoplast; the reaction product can function as a crosslinker. Whether a compound is a powder forming compound can be determined by performing the reaction described above and observing whether an ungelled reaction product is the result.

In the methods of modifying aminoplasts according to the present invention, the aminoplast resin (a) and the modifying compound (b) are combined in a ratio such that the resulting reaction product is substantially free of active hydrogen groups such as OH, COOH, NH and the like; this ratio is referred to herein as an "appropriate ratio". An appropriate ratio of equivalents of (a):(b) is typically between 1:1 and 1:0.2 to assure complete reaction of the active hydrogen containing groups. The reaction is monitored via infrared spectroscopy or other appropriate analytical method for the disappearance of the active hydrogen functionality relative to an internal standard (i.e., the signal of a structure that will remain unchanged during the reaction, for example, a carbonyl group). One aspect of the present methods is that the reaction between the aminoplast and modifying compound is run to completion, i.e. until substantially all of the modifying compound is reacted with the aminoplast; the reaction is also run so as to not promote or allow a significant amount (i.e. >5%) of self-condensation of the aminoplast. Thus, the present methods are distinct from many methods described in the art where similar starting materials are used; those methods either promote or otherwise allow self-condensation of the aminoplast, which results in a gelled or partially gelled material, or provide for stopping the reaction before completion such that reactive groups, such as OH groups, are present in the reaction product. Therefore, the present methods result in the formation of a novel product that is not achieved by other methods taught in the art.

The present invention is also directed to a curable powder coating composition comprising a solid particulate, film-forming mixture of (1) a polymer containing reactive functional groups, and (2) the crosslinking agent described above. The polymer (1) can be selected from a variety of polymers having aminoplast-reactive functional groups well known in the art, so long as the Tg of the polymer is sufficiently high to permit the formation of a stable, solid particulate composition. The Tg of the polymer (1) generally is at least 30° C., often at least 40° C., and typically at least 50° C. The Tg of the polymer (1) also generally is less than 130° C., often less than 100° C., and typically less than 80° C. The Tg of the functional group-containing polymer (1) can range between any combination of these values inclusive of the recited values.

Examples of polymers having reactive functional groups useful in the curable powder coating compositions of the invention include acrylic, polyester, polyurethane, polyepoxide, and polyether polymers. The polymer (1) typically comprises reactive functional groups selected from hydroxyl, epoxy, carboxyl and/or carbamate functional groups, or a combination thereof. In one embodiment of the present invention, the polymer (1) comprises hydroxyl and/or carbamate functional groups. In another embodiment of the invention, the polymer (1) comprises epoxy and/or hydroxyl functional groups.

The functional group-containing polymer (1) generally is present in the present curable powder coating compositions in an amount ranging from at least 5 percent by weight, often at least 20 percent by weight, typically at least 30 percent by weight, and usually at least 40 percent by weight based on the total weight of the powder coating composition. The functional group-containing polymer (1) also generally is present in the present powder coating compositions in an amount less than 95 percent by weight, often less than 90 percent by weight, typically less than 85 percent by weight, and usually less than 80 percent by weight based on the total weight of the powder coating composition. The amount of the functional group-containing polymer (1) in the powder coating compositions of the present invention can range between any combination of these values inclusive of the recited values.

The powder coating compositions of the present invention further comprise, as component (2), the crosslinking agent described above. The crosslinking agent (2) is generally present in an amount ranging from at least 5 percent by weight, often at least 10 percent by weight, typically at least 15 percent by weight, and usually at least 20 percent by weight based on the total weight of the powder coating composition. The crosslinking agent (2) also generally is present in an amount less than 95 percent by weight, often less than 80 percent by weight, typically less than 70 percent by weight, and usually less than 60 percent by weight based on the total weight of the powder coating composition. The amount of the crosslinking agent (2) present in the powder coating compositions of the present invention can range between any combination of these values inclusive of the recited values.

The components (1) and (2) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, the term "cure" as used in connection with a composition, e.g., "a curable composition", shall mean that any crosslinkable components of the composition are at least partially crosslinked. In certain embodiments of the present invention, the crosslink density of the crosslinkable components, i.e., the degree of crosslinking, ranges from 5 percent to 100 percent of complete crosslinking. In other embodiments, the crosslink density ranges from 35 percent to 85 percent of full crosslinking. In other embodiments, the crosslink density ranges from 50 percent to 85 percent of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the Tg and crosslink density of free films of coatings or polymers. These physical properties of a cured material are related to the structure of the crosslinked network.

If desired, the powder coating compositions of the present invention can also include an adjuvant curing agent different from the crosslinking agent (2). The adjuvant curing agent can be any compound having functional groups reactive with the functional groups of the polymer (1) or the crosslinking agent (2) described above. Non-limiting examples of suitable adjuvant curing agents include blocked isocyanates, triazine compounds, conventional aminoplasts, glycoluril resins, and mixtures thereof; the use of these compounds is well known in the art.

A glycoluril resin particularly suitable for use as the adjuvant curing agent is POWDERLINK 1174, commercially available from Cytec Industries, Inc. of Stamford, Conn.

When employed, the adjuvant curing agent generally is present in the powder coating compositions in an amount ranging from 5 to 10 percent by weight, often from 5 to 20 percent by weight, typically from 5 to 30 percent by weight, and usually from 5 to 50 percent by weight based on the total weight of the powder coating composition. When a triazine compound is used as the adjuvant curing agent, it is typically present in the powder coating composition of the present invention in an amount ranging up to about 20 percent by weight, and usually from about 1 to 20 percent by weight, percent by weight being based on the total weight of the powder coating composition. Mixtures of the adjuvant curing agents also can be used advantageously.

Also, it should be understood that, for purposes of the present invention, the curable powder coating compositions that contain epoxy group-containing polymers typically also include an epoxide-reactive curing (i.e., crosslinking) agent, usually an acid functional curing agent, in addition to the aminoplast-based crosslinking agent (2). A secondary hydroxyl group can be generated upon reaction of each epoxy functional group with a functional group of the epoxide-reactive curing agent. These secondary hydroxyl groups are then available for further reaction with the aminoplast-based crosslinking agent (2). Suitable epoxide-reactive curing agents may have functional groups selected from the group consisting of hydroxyl, thiol, primary amines, secondary amines, acid (e.g. carboxylic acid), and mixtures thereof. Useful epoxide reactive curing agents having amine functionality include, for example, dicyandiamide and substituted dicyandiamides. Preferably, the epoxide reactive curing agent has carboxylic acid groups.

The powder coating compositions of the present invention can further include additives commonly known in the art. Typical additives include benzoin, used to reduce entrapped air or volatiles; flow aids or flow control agents, which aid in the formation of a smooth and/or glossy surface, for example, MODAFLOW available from Monsanto Chemical Co.; waxes such as MICROWAX C available from Hoechst; fillers such as calcium carbonate, barium sulfate and the like; pigments and dyes as colorants; UV light stabilizers such as TINUVIN 123 or TINUVIN 900 available from CIBA Specialty Chemicals and catalysts to promote the various crosslinking reactions. Such additives are typically present in the powder coating compositions of the present invention in an amount ranging from 1 to 60 weight percent based on total weight of the powder coating composition.

The powder coating compositions of the invention can be prepared by any means known in the art, such as by blending the functional group-containing polymer (1) and the crosslinking agent (2) in a Henschel blade blender. The mixture is then usually extruded through a Baker-Perkins twin screw extruder at a temperature ranging from 158° F. to 266° F. (70° C. to 130° C.). The resultant chip is usually ground and classified to an appropriate particle size, typically between 20 and 200 microns, in a cyclone grinder/sifter.

The powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, typically to a temperature ranging from 250° F. to 500° F. (121.1° C. to 260.0° C.) for 1 to 60 minutes, and preferably from 300° F. to 400° F. (148.9° C. to 204.4° C.) for 15 to 30 minutes.

The curable powder coating composition can be applied as a primer or primer surfacer, or as a top coat, for example, a "monocoat". In one embodiment, the present invention is directed to a curable powder coating composition that is advantageously employed as a top coat in a multi-layer composite coating composition. Such a multi-layer composite coating composition generally comprises a film-forming base coat, which typically is deposited from a film-forming base coating (typically pigmented) composition, and a top coat applied over the base coat, the top coat being deposited from the curable powder coating composition of the present invention. In a particular embodiment, the multi-component composite coating composition is a color-plus-clear system where the top coat is deposited from a powder coating composition that is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and often a pigment to serve as a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, can also be used as the base coat composition.

As mentioned above, the base coat compositions also can contain pigments of various types as colorants. Suitable metallic pigments include aluminum flake, bronze flake, copper flake, and the like. Other examples of suitable pigments include mica, iron oxides, lead oxides, carbon black, titanium dioxide, talc, as well as a variety of color pigments.

Optional ingredients for the base coat film-forming compositions include those that are well known in the art of surface coatings and include surfactants, flow control agents, thixotropic agents, fillers, anti-gassing agents, organic co-solvents, catalysts, and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions are typically applied to the substrate so that a cured base coat will have a dry film thickness ranging from 0.5 to 4 mils (12.5 to 100 micrometers). After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F., (21° C., to 93° C.,) is adequate.

The curable powder top coating composition can be applied over at least a portion of the base coat by any of the methods of application described above. The curable powder top coating composition can be applied to a cured base coat or a dried but uncured base coat. In the latter case, the top coat and the base coat are cured simultaneously.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

A mixture of 400 grams of (methoxymethyl) melamine-formaldehyde resin (CYMEL 303, from Cytec Industries, Inc.), 100 grams of p-toluenesulfonamide and 214 grams of xylene was heated to 120° C. in the presence of 0.25 grams of p-toluenesulfonic acid under inert atmosphere. The reaction vessel was fitted with a distillation head and distillate was collected at a head temperature of 65° C. until there was no visible signal for the active hydrogen peak in the infrared spectrum. The product from the reaction was analyzed by gel permeation chromatography and differential scanning calorimetry. The results are summarized in Table 1.

Example 2

A mixture of 400 grams of (methoxymethyl) melamine-formaldehyde resin (CYMEL 303, from Cytec Industries, Inc.), 100 grams of N-ethyl-p-toluenesulfonamide and 214 grams of xylene was heated to 120° C. in the presence of 0.25 grams of p-toluenesulfonic acid under inert atmosphere. The reaction vessel was fitted with a distillation head and distillate was collected at a head temperature of 65° C. until there was no visible signal for the active hydrogen peak in the infrared spectrum. The product from the reaction was analyzed by gel permeation chromatography and differential scanning calorimetry. The results are summarized in Table 1.

Example 3

A mixture of 400 grams of (methoxymethyl) melamine-formaldehyde resin (CYMEL 303, from Cytec Industries, Inc.), 100 grams of saccharin and 214 grams of xylene was heated to 120° C. in the presence of 0.25 grams of p-toluenesulfonic acid under inert atmosphere. The reaction vessel was fitted with a distillation head and distillate was collected at a head temperature of 65° C. until there was no visible signal active hydrogen peak in the infrared spectrum. The product from the reaction was analyzed by gel permeation chromatography and differential scanning calorimetry. The results are summarized in Table 1.

Example 4

A mixture of 800 grams of (methoxymethyl) melamine-formaldehyde resin (CYMEL 303, from Cytec Industries, Inc.), 100 grams of saccharin, 100 grams of 2,4-Di-t-butylphenol and 343 grams of xylene was heated to 120° C. in the presence of 0.50 grams of p-toluenesulfonic acid under inert atmosphere. The reaction vessel was fitted with a distilattion head and distillate was collected at a head temperature of 65° C. until there was no active hydrogen signal in the infrared spectrum. The solvent was removed under vacuum and the product from the reaction was analyzed by gel permeation chromatography and differential scanning calorimetry. The results are summarized in Table 1.

TABLE 1

|  | Tg (° C.) | Mn | Mw |
| --- | --- | --- | --- |
| CYMEL 303 (unmodified) | −48 | 365 | 523 |
| Example 1 | 42.8 | 1189 | 12,531 |
| Example 2 | 56.2 | 781 | 2943 |
| Example 3 | 23.7 | 738 | 2313 |
| Example 4 | 19.0 | 815 | 2606 |

As can be seen from Table 1, all of the resins made with aminoplasts modified according to the present invention (Examples 2–4) had a significantly higher Tg as compared to the unmodified melamine product (CYMEL 303). In addition, the number average molecular weight ("Mn") and weight average molecular weight ("Mw") were significantly higher for the reaction product formed from the unsubstituted sulfonamide with two active hydrogens (Example 1) than the monofunctional sulfonamides having only one active hydrogen (Examples 2–4). This illustrates the point discussed above, that sulfonamide with more than one active hydrogen reacts with an aminoplast to form a large chain extended molecule (with a high Mw) as opposed to the monofunctional sulfonamides having only one active hydrogen, wherein only minimal chain extension is observed (relatively low Mw).

Example 5

Into a two-liter four-necked reaction kettle equipped with a thermometer, a mechanical stirrer, a nitrogen inlet, and means for removing the by-product (methanol) were placed 640.0 parts by weight of (methoxymethyl)melamine-formaldehyde resin (CYMEL 303 from Cytec Industries, Inc.), 488.0 parts by weight of benzoic acid, and 1.00 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 29° C.

Example 6

Into a two-liter four-necked reaction kettle equipped with a thermometer, a mechanical stirrer, a nitrogen inlet, and means for removing the by-product (methanol) were placed 640.0 parts by weight of CYMEL 303, 488.0 parts by weight of benzoic acid, 95.4 parts by weight of benzoin, and 1.00 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 38° C.

Example 7

This example describes the preparation of a crosslinking agent of the present invention. The crosslinking agent was prepared by reacting an aminotriazine compound with Bisphenol A in the presence of a strong acid catalyst.

The following ingredients were added to a 12-liter, four-necked reaction flask equipped with a thermometer, stirrer, nitrogen inlet, and means for removing the reaction by-product (methanol): 5040.0 parts by weight of CYMEL 300; 798.0 parts by weight of Bisphenol-A; 2506.0 parts by weight of xylene, and 7.0 parts by weight of p-toluenesulfonic acid. The mixture was heated to a temperature of 80° C. and held at that temperature for a period of 20 minutes until the mixture became homogenous. The reaction mixture was then further heated to a temperature of 118° C. and maintained at that temperature as the methanol by-product was removed from the system. The reaction was monitored by infrared spectroscopy for the disappearance of the hydroxyl signal relative to that of the C—H stretch. The reaction was terminated when this end point was detected. The reaction mixture was subsequently cooled to a temperature of 100° C. at which time 19.3 parts by weight of sodium carbonate were added. The mixture was then further stirred at a temperature of 100° C. for one hour before filtering through a 5 micron filtration bag. Thereafter, the mixture was concentrated in vacuo at a temperature of 100° C. to 130° C. and a pressure of 3–50 mm Hg to remove the xylene solvent. The reaction product thus obtained was a pale yellow solid with a softening temperature of 38° C. The presence of the benzoxazine structure in this reaction product was confirmed by NMR spectroscopy.

Example 8

This example describes the, preparation of a crosslinking agent of in accordance with the present invention. The crosslinking agent was prepared by reacting an aminotriazine compound with 2,5-di-tert-butyl hydroquinone in the presence of a strong acid catalyst.

The following ingredients were added to a 2-liter, four-necked reaction vessel equipped with a thermometer, stirrer, nitrogen inlet, and means for removing the reaction by-product (methanol): 560.0 parts by weight of CYMEL 300; 111.0 parts by weight of 2,5-di-tert-butyl hydroquinone; 287.7 parts by weight of xylene; and 0.24 part by weight of p-toluenesulfonic acid. The mixture was heated to a temperature of 80° C. and held at that temperature for a period of 20 minutes until the mixture became homogenous. The reaction mixture was then further heated to a temperature of 118° C. and maintained at that temperature as the methanol by-product was removed from the system. The reaction was monitored by infrared spectroscopy for the disappearance of the hydroxyl signal (3200–3600 cm$^{-1}$) relative to that of the C—H stretch. The reaction was terminated when this end point was detected. The reaction mixture was subsequently cooled to a temperature of 100° C. at which time 0.66 part by weight of sodium carbonate was added. The reaction mixture was further stirred at a temperature of 100° C. for one hour before filtering through a 5 micron filtration bag. Thereafter, the reaction product was concentrated in vacuo at a temperature ranging from 100° C. to 130° C. and a pressure of 3 to 50 mm Hg to remove the xylene solvent. The reaction product thus obtained was a pale yellow solid. The presence of the benzoxazine structure in this reaction product was confirmed by NMR spectroscopy.

Example 9

This example describes the preparation of a crosslinking agent of the present invention (crosslinking agent I) obtained by pre-reacting a polyester polyol and phenyl isocyanate, and subsequently reacting the reaction product with an aminotriazine compound, CYMEL 300. The crosslinking agent I was prepared in two steps as follows:

Step 1: Preparation of the Polyester

The following ingredients were added to a two-liter, four-necked reaction vessel equipped with a thermometer, stirrer, nitrogen inlet, and a separator: 955.0 parts by weight of hydrogenated Bisphenol-A; 308.0 parts by weight of hexahydrophthalic anhydride; 1.3 parts by weight of dibutyl tin oxide, and 1.3 parts by weight of triisodecylphosphite. The mixture was melted by heating and then further heated to a temperature of 230° C. as water resulting from the condensation reaction was removed through the separator. The reaction was terminated when an acid value of 2 was achieved. The polyester polyol thus formed had a hydroxyl number of 160 and Tg of 65° C.

Step 2: Preparation of the Crosslinking Agent I

The following ingredients were added to a two-liter, four-necked reaction vessel equipped with a thermometer, stirrer, nitrogen inlet, and means for removing the reaction by-product (methanol): 284.6 parts by weight of the polyester of Step 1 above; and 340.0 parts by weight of xylene. The reaction mixture was heated to a temperature of 110° C. and held at that temperature for a period of two hours under constant nitrogen sparge. The reaction mixture was then cooled to a temperature of 60° C. at which time a mixture of 95.3 parts by weight of phenyl isocyanate and 0.8 part by weight of di-butyl tin di-laurate was added dropwise through an addition funnel. Subsequently, 100.0 parts by weight of xylene was added and the reaction mixture was held at a temperature of 90° C. until the mixture was free of NCO functionality. Thereafter, 640.0 parts by weight of CYMEL 300 and 2.0 parts by weight of p-toluenesulfonic acid was added to the reaction vessel. The reaction mixture was then heated to a temperature of 120° C. and the temperature was maintained as the methanol by-product was removed from the system. The reaction was monitored by infrared spectroscopy for the disappearance of the urethane N—H signal (3200–3600 cm$^{-1}$) relative to that of the the urethane carbonyl. The reaction was terminated when this end point was detected. The reaction mixture was subsequently cooled to temperature of 100° C. at which time 5.52 parts by weight of sodium carbonate were added. The mixture further stirred at a temperature of 100° C. for one hour before filtering through a 5 micron filtration bag. The reaction product was then concentrated in vacuo at a temperature of 100° C. to 130° C. and a pressure of 3 to 50 mm Hg to remove the xylene solvent. The reaction product thus obtained was a pale yellow solid with a softening temperature of about 35° C.

Example 10

This example describes the preparation of a crosslinking agent II of the present invention obtained by reaction of a methanol-capped isophorone diisocyanate trimer with an aminotriazine compound, CYMEL 300. The crosslinking agent II was prepared as follows:

The following ingredients were added to a two-liter, four-necked reaction vessel equipped with a thermometer, stirrer, nitrogen inlet, and means for removing the reaction by-product (methanol): 355.2 parts by weight of isophorone diisocyanate trimer; 300.5 parts by weight of xylene; and 0.5 part by weight of di-butyl tin di-laurate. The admixture was heated to a temperature of 60° C. at which time 64.0 parts by weight of methanol were added dropwise through an addition funnel. The reaction mixture was then further heated to and held at a temperature of 90° C. until free of NCO functionality. Thereafter, 1280.0 parts of CYMEL 300 and 3.0 parts of p-toluenesulfonic acid were added to the reaction vessel. The mixture was heated to a temperature of 120° C. and maintained at that temperature as the methanol by-product was removed from the system. The reaction was monitored by infrared spectroscopy for the disappearance of urethane N—H signal (3200–3600 cm$^{-1}$) and terminated when this end point was detected. The reaction product was then concentrated in vacuo at a temperature ranging from 100° C. to 130° C. and a pressure of 3 to 50 mm Hg to remove the xylene solvent. The reaction product thus obtained was a pale yellow solid having a softening temperature of about 25° C.

Example 11

This example describes the preparation of a crosslinking agent of the present invention. The crosslinking agent was prepared in two steps as described below.

Step 1: Preparation of the Polyester Polyol

A polyester polyol was prepared as follows. Added to a two-liter, four-necked reaction vessel equipped with a thermometer, stirrer, nitrogen inlet, and a separator were 955.0 parts of hydrogenated Bisphenol-A, 308. 0 parts of hexahydrophthalic anhydride, 1.3 parts of di-butyl tin oxide, and 1.3 parts of triisodecylphosphite. The reaction mixture was melted by heating, then further heated to a temperature of 230° C. while water resultin from the condensation reaction was removed through the separator. When an acid value of 2 was achieved, the reaction was terminated. The polyester polyol thus prepared had a hydroxyl number of 160 and Tg of 65° C.

Step 2: Preparation of the Crosslinker

The crosslinker was prepared as follows. Into a three-liter, four-necked reaction vessel equipped with a thermometer, stirrer, nitrogen inlet, and means for removing the reaction by-product (methanol) were added 768.0 parts of CYMEL 300, 426.9 parts of the polyester polyol of Step 1 above, 512.2 parts of xylene, and 0.34 part of p-toluenesulfonic acid. The admixture was heated to 80° C. and held at that temperature for a period of 20 minutes at which time the reaction mixture became homogenous. The reaction mixture was then further heated to a temperature of 118° C. and held at that temperature as the methanol by-product was removed from the system. The reaction was monitored by infrared spectroscopy for the disappearance of hydroxyl signal (3200–3600 cm$^{-1}$) terminated when this end point was detected. The mixture was subsequently cooled to a temperature of 100° C. at which time 0.94 part by weight of sodium carbonate was added. The reaction mixture was further stirred at a temperature of 100° C. for one hour before being filtered through a 5 micron filtration bag. Thereafter, the mixture was concentrated in vacuo at a temperature of 100° C. to 130° C. at a pressure of 3 to 50 mm Hg to remove the xylene solvent. The reaction product thus obtained was a pale yellow solid with a softening temperature of 40° C.

Example 12

Into a two-liter four-necked reaction kettle equipped with a thermometer, a mechanical stirrer, nitrogen inlet, and means for removing the by-product (methanol) were placed 640.0 parts of CYMEL 300 (available from Cytec Industries, Inc.), 424.0 parts of benzoin, 366.0 parts of xylene, and 0.64 part of p-toluenesulfonic acid. The mixture was heated to 120° C. over 30 minutes and the temperature was maintained while the methanol by-product was removed from the system. The reaction was monitored by measuring the IR spectra of the mixture and was terminated when the end point was detected. Thereafter, the mixture was concentrated at a temperature of 100° C. to 130° C. in a vacuum of 3–50 mm Hg to remove the xylene solvent. The product thus obtained was a slightly yellow solid.

Example 13

Into a two-liter four-necked reaction kettle equipped with a thermometer, a mechanical stirrer, nitrogen inlet, and means for removing the by-product (methanol) were placed 640.0 parts of CYMEL 300, 308.0 parts of isoborneol, 84.8 parts of benzoin, 442.8 parts of xylene, and 0.64 part of p-toluenesulfonic acid. The mixture was heated to 120° C. over 30 minutes and the temperature was maintained while the methanol by-product was removed from the system. The reaction was monitored by measuring the IR spectra of the mixture and was terminated when the end point was detected. Thereafter, the mixture was concentrated at a temperature of 100° C. to 130° C. in a vacuum of 3–50 mm Hg to remove the xylene solvent. The product thus obtained was a slightly yellow solid.

Example 14

Into a two-liter four-necked reaction kettle equipped with a thermometer, a mechanical stirrer, nitrogen inlet, and a separator were placed 955.0 parts of hydrogenated Bisphenol A, 308.0 parts of hexahydrophthalic anhydride, 1.3 parts of dibutyl tin oxide, and 1.3 parts of triisodecylphosphite. The mixture was melted by heating and was further heated to 230° C. while the water resulting from the reaction was removed through the separator. The reaction was stopped when an acid value of 2 was achieved. The polyester had a hydroxyl number of 160 and Tg around 65° C.

Example 15

Into a two-liter four-necked reaction kettle equipped with a thermometer, a mechanical stirrer, nitrogen inlet, and means for removing the by-product (methanol) were placed 279.3 parts of the polyester (1) of Example 14, and 340.0 parts of xylene. The mixture was heated to 110° C. and held for two hours under constant nitrogen sparge. It was then cooled down to 60° C. and a mixture of 95.3 parts of phenyl isocyanate and 0.8 part of di-butyl tin di-laurate was added dropwise through an addition funnel. 100.0 parts of xylene were charged subsequently and the mixture was held at 90° C. until it was free of NCO functionality. Thereafter, 640.0 parts of CYMEL 300, 106.0 parts of benzoin, and 2.0 parts of p-toluenesulfonic acid were added to the kettle. The mixture was heated to 120° C. and the temperature was maintained while the methanol by-product was removed from the system. The reaction progress was monitored by measuring the IR spectra of the mixture and was terminated when the end point was detected. It was then concentrated at a temperature of 100° C.–130° C. in a vacuum of 3–50 mm Hg to remove the xylene solvent. The product thus obtained was a pale yellow solid with a softening temperature of around 40° C.

Whereas particular embodiments of this invention have been described above for purposes of illustration, it will be evident to those skilled in the art the numerous variations of the details of the present invention may be made without departing from the invention as defined in the appended claims.

Therefore we claim:

1. A crosslinking agent comprising an ungelled reaction product of the following reactants:
   (a) an aminoplast resin; and
   (b) a monofunctional sulfonamide having only one active hydrogen;
   wherein the crosslinking agent has a glass transition temperature of at least 10° C. and is substantially free of functional groups that are reactive with the aminoplast resin; wherein the aminoplast resin comprises an aminotriazine compound comprising an (alkoxyalkyl) aminotriazine having one or less non-alkylated NH bond per triazine ring.

2. The crosslinking agent of claim 1, wherein the (alkoxyalkyl) aminotriazine compound comprises a (methoxymethyl) aminotriazine compound.

3. The crosslinking agent of claim 1, wherein the (alkoxyalkyl) aminotriazine compound has a degree of polymerization of 3.0 or less.

4. A crosslinking agent comprising an ungelled reaction product of the following reactants:
(a) an aminoplast resin; and
(b) a monofunctional sulfonamide having only one active hydrogen;
wherein the crosslinking agent has a glass transition temperature of at least 10° C. and is substantially free of functional groups that are reactive with the aminoplast resin; wherein (a) comprises an alkoxylated aldehyde condensate of glycoluril.

5. The crosslinking agent of claim 4, wherein the alkoxylated aldehyde condensate of glycoluril comprises tetramethoxy methylglycoluril.

6. The crosslinking agent of claim 1, wherein (b) is saccharin.

7. The crosslinking agent of claim 6, wherein (b) is N-alkyl-p-toluene sulfonamide.

8. A crosslinking agent comprising an ungelled reaction product of the following reactants:
(a) an aminoplast resin; and
(b) a monofunctional sulfonamide having only one active hydrogen;
wherein the crosslinking agent has a glass transition temperature of at least 10° C. and is substantially free of functional groups that are reactive with the aminoplast resin; wherein said reaction product further comprises:
(c) a mono-hydroxy aromatic compound having structure (V):

(V)

wherein each of $R_8$ through $R_{12}$ are the same or different and are selected from H, a monovalent hydrocarbon group, $COOR_{13}$ where $R_{13}$ is H or a monovalent hydrocarbon group, $NO_2$, halogen or $X_1R_{14}$, where $X_1$ is oxygen or sulfur and $R_{14}$ is a monovalent hydrocarbon group having 1 to 8 carbon atoms.

9. The crosslinking agent of claim 8, wherein (c) is t-butyl-phenol.

10. The crosslinking agent of claim 9, wherein (b) is saccharin.

11. The crosslinking agent of claim 9, wherein (b) is N-alkyl-p-toluene sulfonamide.

12. A curable powder coating composition comprising a solid particulate film-forming mixture of the following components:
(1) a polymer containing reactive functional groups, said polymer having a glass transition temperature of at least 30° C.; and
(2) the crosslinking agent of claim 1.

13. A multilayer composite coating composition comprising a base coat deposited from a film-forming coating base coating composition and a top coat over at least a portion of the base coat deposited from a curable powder top coating composition comprising a solid particulate film-forming mixture of the following components:
(1) a polymer containing reactive functional groups, said polymer having a glass transition temperature of at least 30° C.; and
(2) the crosslinking agent of claim 1.

14. A substrate coated with the powder coating composition of claim 12.

15. A substrate coated with the multilayer composite coating composition of claim 13.

* * * * *